UNITED STATES PATENT OFFICE.

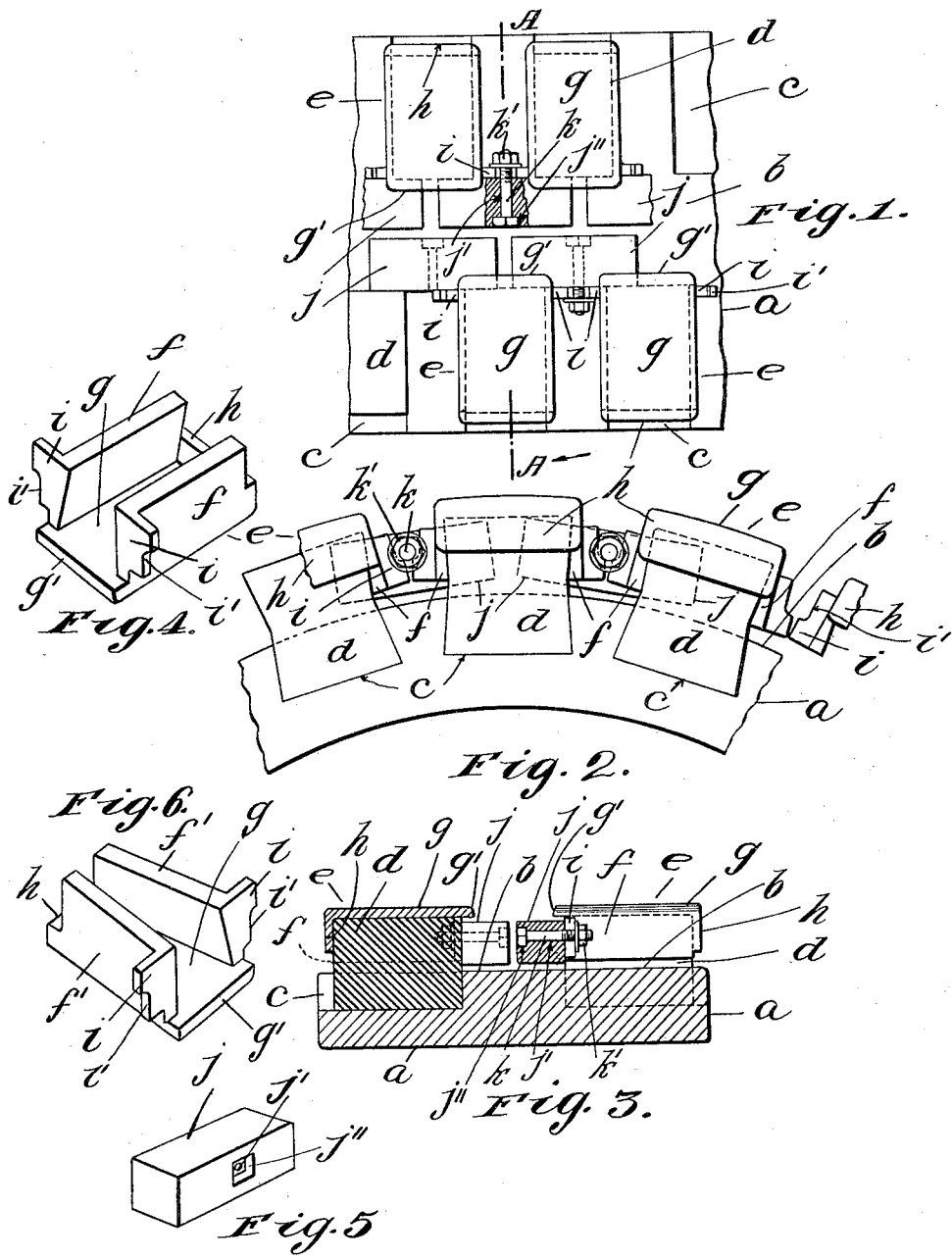

WILLIAM H. BLAKE, OF JERSEY CITY, NEW JERSEY.

TIRE FOR WHEELS.

1,102,860.  Specification of Letters Patent.  Patented July 7, 1914.

Application filed December 3, 1910. Serial No. 595,340.

*To all whom it may concern:*

Be it known that I, WILLIAM H. BLAKE, a citizen of the United States, residing at Jersey City, in the county of Hudson and State of New Jersey, have invented certain new and useful Improvements in Tires for Wheels, of which the following is a specification, reference being had to the accompanying drawings.

This invention relates to improvements in tires for road vehicles and particularly to improvements in tires of resilient material, such as rubber blocks, for heavy vehicles of the self-propelled type (*e. g.*, motor trucks and motor wagons); and an object of this invention is to provide a tire of the character just referred to with means for preventing wear of the resilient material by protecting the same from the abrading action of the roadway.

Another object of this invention is to provide a resilient tire in which the amount of the resilient material may be reduced to a minimum without sacrificing the resiliency of the tire, and thereby to reduce the cost of such tires.

A third object of this invention is to provide a resilient vehicle tire the cost of the upkeep of which will be small, which may be readily repaired by an unskilled person and which will be durable and efficient in use.

In the drawings illustrating the principle of this invention and the best mode in which I have contemplated applying that principle, Figure 1 is a plan of so much of a tire as is necessary to illustrate this invention; Fig. 2 is a side elevation of the same; Fig. 3 is a section on the line A—A of Fig. 1; Fig. 4 is a perspective view of the cap or shoe detached and inverted; Fig. 5 is a detail showing in perspective the retaining plate detached; and Fig. 6 is a detail showing a slightly modified form of the cap illustrated in Fig. 4.

Referring to Figs. 1 to 5, inclusive, the rim $a$ of the wheel is formed in its outer face or tread $b$ with two series of dovetail-shaped pockets or recesses $c$, the pockets of one series being out of register or staggered with relation to the pockets of the other series and both series of pockets being circumferentially arranged. The pockets extend axially of the wheel or transversely of the tread of the rim and are open at their outer ends. Into each pocket is slipped from its outer open end a rubber block $d$ the base of which flares outwardly and downwardly from the middle of the block and is, therefore, wedge-shaped and thereby adapted to fit snugly in the dovetail-shaped pocket $c$. The top portions (those which project beyond the tread face and lie outside of the pockets) of the blocks $d$ flare upwardly and outwardly and are wedge-shaped; and over these top portions are slipped the metal caps or shoes $e$ each of which is formed with lateral walls or sides $f$, a top $g$ having a projecting end $g'$, and a downwardly-extending end flange $h$ at the end opposite the part $g'$. Near the latter each lateral wall is formed at its end with an outwardly-extending ear or lug $i$ having a notch $i'$ in one of its edges. A retaining plate $j$ overlies each pair of adjacent ears $i$ and is formed with a hole $j'$ through which is passed a bolt $k$ the head of which lies in a countersunk recess $j''$ at one end of the hole $j'$ and is prevented from turning by the plane walls of the recess. The threaded end of the bolt $k$ extends through the notches $i'$ of the adjacent ears $i$ and on it is screwed a nut $k'$ by tightening which the head of the bolt $k$ is drawn into the recess $j''$ and the ears $i$ and the retaining plate $j$ are firmly fastened together. The ends of the retaining plate $j$ bear against the inner ends of adjacent blocks $d$ and the projecting ends $g'$ of the shoes or caps $e$ overhang the ends of the plate $j$ so as to prevent displacement thereof in a radial direction away from the tread of the rim. The lateral walls of the cap or shoe may converge toward the outer end or the end formed with the end flange $h$, as is shown in Fig. 6. This makes the cap fit tightly on the rubber block, which is compressed between the converging lateral walls $f'$.

Since the metallic caps prevent the wear of the rubber block, the latter need not be made as large as they are now made in unprotected tires; and from this it results that a saving in rubber is effected by the use of my invention. Economy of rubber also results from the fact that the metallic caps for the blocks greatly lengthen the life of the latter. In case any block gives out, the driver, who carries a supply of extra caps and blocks, may readily replace the worn-out block, since the parts are readily detachable from each other, as hereinbefore explained. Even an unskilled person may detach these parts and may replace the worn-out parts with new ones, whereby the cost of upkeep is greatly lessened.

In accordance with the provisions of the patent statutes, I have described the principle of operation of my invention, together with the apparatus which I now consider to represent the best embodiment thereof; but I desire to have it understood that the apparatus shown is only representative and that the invention can be carried out by other means.

I claim:

1. A vehicle wheel having a rim; a pair of resilient blocks mounted therein; open-ended shoes which are mounted on the tread portions of said blocks; and a retaining device which is fastened to said shoes and the ends of which project over the open ends of the latter and over the ends of the blocks adjacent or corresponding to said open ends.

2. A vehicle wheel having a rim; a pair of resilient blocks mounted therein; open-ended shoes which are mounted on the tread portions of said blocks and which are formed with lugs; and a retaining device which is fastened to said lugs and the ends of which project over the open ends of said shoes and over the ends of the blocks adjacent to said open ends.

3. A vehicle wheel having a rim; a pair of resilient blocks mounted therein; open-ended shoes which are mounted on the tread portions of said blocks and the lateral faces of which are converging; and a retaining device which is fastened to said shoes and the ends of which project over the open ends of the latter and over the ends of the blocks adjacent thereto.

4. A vehicle wheel having a rim formed with a pair of open-ended pockets which extend transversely of the tread face of the rim; a pair of resilient blocks mounted in said pockets; channeled shoes which are mounted on the tread portions of said blocks and extend transversely of the tread face of the rim; said shoes being closed at one end and open at the opposite end; and retaining means which connect the open ends of said shoes and retain the same aginst displacement lengthwise of said blocks; the open ends of said shoes being opposite the open ends of said pockets.

5. A vehicle wheel having a rim formed with a pair of recesses which extend transversely of the tread face of the rim and the ends of which at the side of the rim are open, the opposite ends being closed; a pair of resilient blocks mounted in said recesses; channeled shoes which are mounted on the tread portions of said blocks and extend transversely of the tread face of the rim; said shoes being closed at one end and open at the opposite end; and retaining means which connect the open ends of said shoes and retain the same against displacement lengthwise of said blocks; the open ends of said shoes being opposite the open ends of said recesses.

6. A vehicle wheel having a rim formed with a plurality of series of recesses which extend transversely of the tread face of the rim and the ends of which at the sides of the rim are open, the opposite or inner ends being closed and each of said series extending circumferentially around the rim; resilient blocks mounted in said recesses; open-ended shoes which are mounted on the tread portions of said blocks and extend transversely of the tread face of the rim; said shoes being closed at one end and open at the opposite end and formed with lateral converging walls; and retaining means which connect the open ends of said shoes and retain the same against displacement lengthwise of said blocks; the open ends of said shoes being opposite the open ends of said recesses.

7. A vehicle wheel having a rim formed with a pair of recesses which extend transversely of the tread face of the rim and the ends of which at the side of the rim are open, the opposite ends being closed; a pair of resilient blocks dove-tailed in said recesses; channeled shoes which are mounted on the tread portions of said blocks and extend transversely of the tread face of the rim; said shoes being closed at one end and open at the opposite end; and retaining means which connect the open ends of said shoes and retain the same against displacement lengthwise of said blocks; the open ends of said shoes being opposite the open ends of said recesses.

8. A vehicle wheel having a rim formed with dovetail-shaped recesses which extend transversely of the tread face of the rim and the ends of which at the side of the rim are open, the opposite ends being closed; a pair of resilient blocks dove-tailed in said recesses; channeled shoes which are mounted on the tread portions of said blocks and extend transversely of the tread face of the rim; said shoes being closed at one end and open at the opposite end and having lateral converging walls; and retaining means which connect the open ends of said shoes and retain the same against displacement lengthwise of said blocks; the open ends of said shoes being opposite the open ends of said recesses.

9. A vehicle wheel having a rim formed with a plurality of series of recesses which are dovetail-shaped and extend transversely of the rim and the ends of which at the sides of the rim are open, the opposite or inner ends being closed and each of said series extending circumferentially around the rim; resilient blocks dovetailed in said recesses; shoes which are mounted on the tread portions of said blocks and extend transversely of the tread face of the rim; said shoes being closed at one end and open at the opposite end and formed with lateral converging walls; and retaining means which connect the open ends of said shoes and retain the same against displacement lengthwise of said blocks; the open ends of said shoes being opposite the open ends of said recesses.

In testimony whereof I hereunto set my hand this second day of December, 1910, at New York city, New York, in the presence of the two undersigned witnesses.

WILLIAM H. BLAKE.

Witnesses:
E. I. McCARTHY,
JAMES HAMILTON.

Copies of this patent may be obtained for five cents each, by addressing the "Commissioner of Patents, Washington, D. C."